(12) United States Patent
Nilsson et al.

(10) Patent No.: US 9,062,222 B2
(45) Date of Patent: Jun. 23, 2015

(54) PACKAGING MATERIAL COMPRISING MAGNETISABLE PORTIONS

(75) Inventors: Tommy Nilsson, Eslöv (SE); Ann-Charlotte Klint, Löddeköpinge (SE); Lars Bergholtz, Höganäs (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 13/322,867

(22) PCT Filed: May 7, 2010

(86) PCT No.: PCT/SE2010/000128
§ 371 (c)(1),
(2), (4) Date: Nov. 28, 2011

(87) PCT Pub. No.: WO2010/138052
PCT Pub. Date: Dec. 2, 2010

(65) Prior Publication Data
US 2012/0076995 A1 Mar. 29, 2012

(30) Foreign Application Priority Data
May 29, 2009 (SE) ...................................... 0900726

(51) Int. Cl.
*G01B 7/00* (2006.01)
*C09D 11/00* (2014.01)
(Continued)

(52) U.S. Cl.
CPC ......... *C09D 11/00* (2013.01); *Y10T 428/24802* (2015.01); *B31B 2201/143* (2013.01); *B31B 2201/145* (2013.01); *B31B 2201/95* (2013.01); *B31B 2203/066* (2013.01); *B31B 2203/082* (2013.01); *B32B 7/00* (2013.01); *B32B 15/12* (2013.01); *B32B 15/20* (2013.01); *B32B 29/00* (2013.01); *B65B 61/02* (2013.01);
(Continued)

(58) Field of Classification Search
USPC .................... 428/35.7, 34.2; 53/450; 324/260
See application file for complete search history.

(56) References Cited

U.S. PATENT DOCUMENTS 3,237,973 A * 3/1966 Rumberger ..................... 283/62
5,453,121 A 9/1995 Nicholls et al.
(Continued)

FOREIGN PATENT DOCUMENTS

DE 10301107 A1 8/2004
EP 0 705 759 A1 4/1996
(Continued)

OTHER PUBLICATIONS

International Search Report (PCT/ISA/210) issued on Sep. 9, 2010, by Swedish Patent Office as the International Searching Authority for International Application No. PCT/SE2010/000128.
(Continued)

*Primary Examiner* — Ellen S Wood
(74) *Attorney, Agent, or Firm* — Buchanan Ingersoll & Rooney P.C.

(57) ABSTRACT

A packaging material comprises a plurality of magnetisable portions thereon. The magnetisable portions are provided as at least one spot per package to be formed from the packaging material. The spots comprise magnetisable particles and are provided on the side of the paper layer intended to face to the interior of the package.

21 Claims, 3 Drawing Sheets

(51) Int. Cl.
  *B32B 7/00* (2006.01)
  *B32B 15/12* (2006.01)
  *B32B 15/20* (2006.01)
  *B32B 29/00* (2006.01)
  *B65D 65/40* (2006.01)
  *B65B 61/02* (2006.01)

(52) U.S. Cl.
  CPC ............ *B65B 61/025* (2013.01); *B65D 65/40* (2013.01); *B65D 2313/04* (2013.01)

(56) References Cited

U.S. PATENT DOCUMENTS

| | | | |
|---|---|---|---|
| 5,704,190 A * | 1/1998 | Kaneko et al. | .............. 53/51 |
| 5,762,263 A | 6/1998 | Chamberlain, IV | |
| 6,255,948 B1 | 7/2001 | Wolpert et al. | |
| 2004/0149602 A1 | 8/2004 | Draghetti et al. | |
| 2005/0287351 A1* | 12/2005 | Johansson et al. | ........... 428/323 |
| 2012/0067953 A1 | 3/2012 | Nilsson | |
| 2012/0070633 A1 | 3/2012 | Nilsson et al. | |
| 2012/0070634 A1 | 3/2012 | Holmström | |
| 2012/0070638 A1 | 3/2012 | Nilsson et al. | |
| 2012/0073242 A1 | 3/2012 | Nilsson et al. | |
| 2012/0074234 A1 | 3/2012 | Nilsson et al. | |
| 2012/0077001 A1 | 3/2012 | Klint et al. | |

FOREIGN PATENT DOCUMENTS

| | | |
|---|---|---|
| JP | 0710108 A | 1/1995 |
| JP | 2005525253 A | 8/2005 |
| JP | 2007-131311 A | 5/2007 |
| RU | 2094172 C1 | 10/1997 |
| RU | 2245253 C2 | 1/2005 |
| WO | WO 97/24278 A1 | 7/1997 |
| WO | 99/23181 A1 | 5/1999 |
| WO | 2006135313 A1 | 12/2006 |
| WO | WO 2006/135315 A1 | 12/2006 |

OTHER PUBLICATIONS

Japanese Office Action dated Jan. 7, 2014, issued in corresponding Japanese Patent Application No. 2012-513009 and an English Translation of the Japanese Office Action. (9 pgs).

Extended European Search Report dated Feb. 26, 2014, issued by the European Patent Office in corresponding European Patent Application No. 10780873.5 (3 pgs).

Supplementary European Search Report dated Feb. 18, 2014, issued by the European Patent Office in corresponding European Patent Application No. 10780873.5 (2 pg).

* cited by examiner

PACKAGING MATERIAL COMPRISING MAGNETISABLE PORTIONS

TECHNICAL FIELD

The present invention relates to a packaging material comprising magnetisable portions, wherein the material is intended for forming e.g. food packages.

BACKGROUND

Within packaging technology where a packaging container is formed from a packaging material, it is known to provide the packaging material as a web which prior or during packaging is formed to the packaging container. Guiding marks, e.g. for optical reading has been provided to guide operations when finishing the package, such as forming, sealing, folding, etc. Such guiding marks are sometimes referred to as register marks. The register mark for optical reading is provided during printing of the packing material, where e.g. decoration or product information is printed on the packaging material. A problem with such register marks is that they consume a non-negligible area of what becomes the exterior of the package. A further problem is that such a register mark has to rely on the printing being well aligned with other operations performed on the web. It is therefore a desire to provide an improved provision of marking of web of packaging material.

SUMMARY

The present invention is based on the understanding that magnetic marking can be provided on a packaging material. Storing information in a magnetic recording medium in packaging material has been suggested in e.g. EP 705759 A1. In the present disclosure, it is suggested that one or more spots per intended package to be formed from the web is provided on the web, wherein the spots comprises magnetisable particles such that magnetic marking is enabled.

According to a first aspect, there is provided a packaging material comprising a plurality of magnetisable portions thereon, being provided as at least one spot per package to be formed from the packaging material, the spots comprising magnetisable particles and being provided on the side of the paper or paperboard layer intended to face towards the interior of the package.

Preferably, said magnetisable portions are printed directly on the surface of said paper or paperboard layer intended to face towards the interior of the package. In this preferred embodiment of the packaging material of the invention said plurality of magnetisable portions are well hidden by the paper or paperboard layer and are invisible from outside a packaging container manufactured from said packaging material. A further advantage of this preferred embodiment is that the packaging material can be provided with a more or less non-limited number of magnetisable portions without affecting the outside appearance of the final packaging container, each of said magnetisable portions being adapted to carry magnetic information for mutually different functional or other purposes.

In a preferred embodiment, said packaging material comprising magnetisable portions printed directly on the inside surface of said paper or paperboard layer can be provided with a gas-tight Al-foil, said Al-foil preferably being laminated to said printed inside surface of the paper or paperboard layer so as to completely hide said magnetisable portions from outside as well as from inside the packaging container. An Al-foil laminated to the paper or paperboard layer in this manner will also contribute to prevent direct contact between the printed magnetisable portions and a product, such as a liquid food product, filled in a packaging container manufactured from the packaging material.

The material may comprise a laminate which comprises a layer of paper and a layer of plastic coating, and the spots are provided on the layer of paper. The at least one spot may be printed on the side of the paper layer intended to face to the interior of the package. The laminate may further comprises a metal foil layer of a non-ferromagnetic metal such that the magnetisable portion is electromagnetically accessible through the metal foil.

The prints may be made by a magnetisable ink comprising magnetisable particles, a solvent and a binder. The magnetisable particles may be chosen from the group consisting of magnetite and maghemite. The binder may be chosen from the group consisting of acrylate, acrylics such as styrene acrylic copolymer, polyurethane, nitrocellulose, polyamide and latex. The binder may comprise two of the group, wherein one serves as a dispersant such that the magnetisable particles are evenly dispersed in the ink and the other serves as an adhesive to the packaging material. The amount of binder may be between 20 and 60 percent of weight of the ink, preferably between 40 and 60 percent, preferably between 50 and 55 percent. The ink may further comprise additives, such as waxes and/or antifoaming agent. The waxes may comprise any of a group comprising polyethylene, polypropylene, silicone, polyamide, ethylene vinyl acetate, ethylene butyl acetate, ethylene acrylic acid and polytetrafluoro ethylene. The antifoaming agent may comprise silicone or mineral oil. The solvent may comprise any of a group comprising ethanol, ethylic acetate, water, iso-propanol, glycol, or a retarder solvent. The amount of magnetisable particles is between X and Y percent weight of the ink. The size of the magnetisable particles may be between 0.1 and 2.5 µm, preferably between 0.1 and 0.8 µm or preferably between 0.4 and 1.5 µm, preferably about 0.3 µm or preferably about 1 µm.

DETAILED DESCRIPTION

Figure 1:
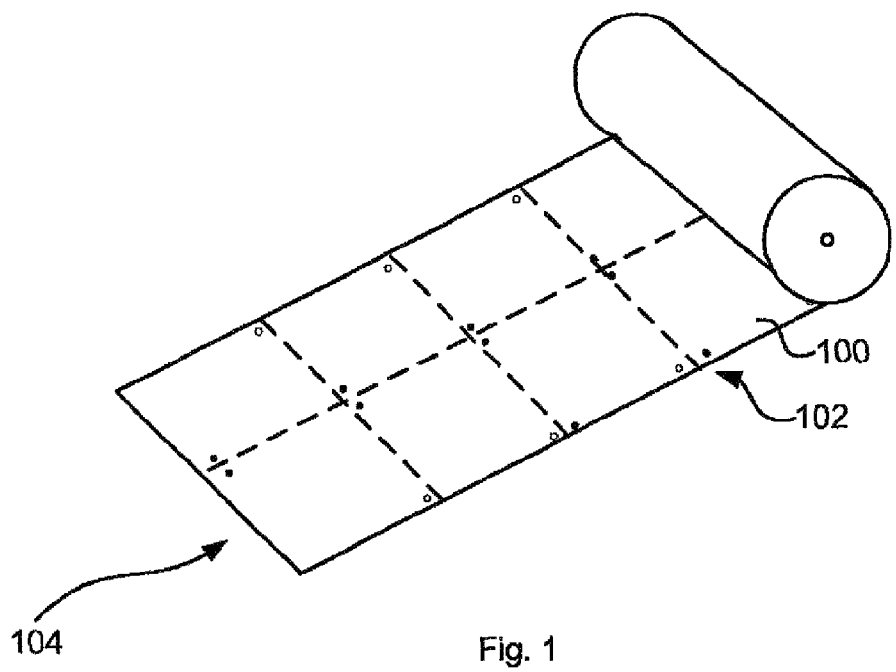
FIG. 1 schematically illustrates a web of packaging material according to an embodiment.

FIG. 1 illustrates web 100 of packaging material, where a plurality of magnetisable portions 102 are provided. The magnetisable portions are preferably distributed upon printing them such that there is at least one magnetisable portion 102 per package 104 to be formed from the packaging material. The dashed lines are imaginary and are intended to show the plurality of parts that will form the packages. For reducing the consumption of the magnetic material, i.e. magnetisable ink consumption, the magnetisable portions are provided as spots or the like at parts where magnetic marks are intended to be positioned. Since there is a limited precision in positioning between printing and the assignment of the magnetic mark, cf. the problem with optical marks, the spots are preferably slightly larger than the actual size needed for the magnetic mark. Thus, any reasonable deviation can be handled. The spots are thus provided with magnetisable particles, which can be provided with magnetic marks, and, as will be further elucidated below, depending on the form and size of the spots, be provided with more complex information by modulated magnetisation. The packaging material is preferably a laminate, or a single layer material such as a polymer material.

Figure 2:
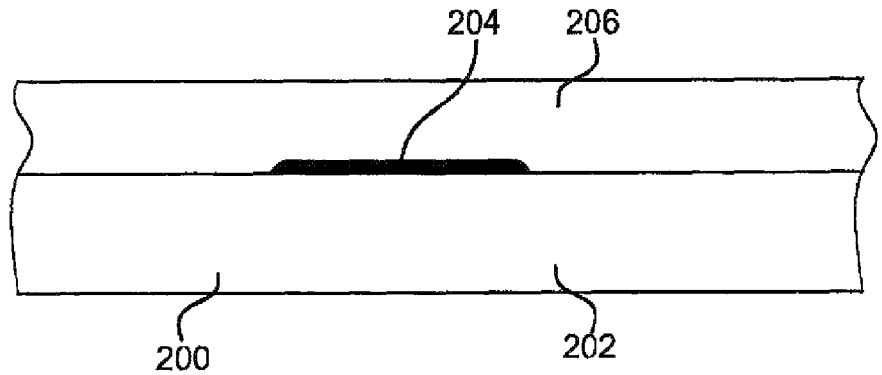
FIG. 2 illustrates an example of laminate structure of a packaging material.

FIG. 2 illustrates that the packing laminate 200 can comprise a layer of paper 202, on which the printing of the magnetisable portions 204 can be made, and one or more layers of plastic coating 206. Here, the term plastic coating should be construed as any coating including suitable polymers for food containers. The packing laminate can also comprise a metal foil layer. To be able to write and read the magnetic mark through the metal foil layer, the metal is preferably non-ferromagnetic, such as aluminium.

The print of the magnetisable portions is made on a side of the layer it is printed on of the laminate facing towards the intended interior of the package to be formed. Thus, it does not interfere with exterior printing of e.g. decorations or product information on the package. The print is preferably made by using a magnetisable ink as will be demonstrated below, and such that the print becomes between 4 and 10 µm in thickness when dried, preferably between 6 and 8 µm.

A magnetisable ink is provided such that the magnetisable portions can be provided on the packaging laminate, which packaging laminate is to be used for forming e.g. food packages such as beverage and food containers, or containers for basic or additive products for preparing food or beverages. The ink comprises magnetisable particles for provision of the magnetic features of the magnetisable portions.

The ink further comprises a solvent. Purpose of the solvent can be to keep a system for distributing the ink at printing flowing and open. The solvent can be water-based or monomer-based. Examples on solvents are ethanol, ethylic acetate, water, iso-propanol, glycol, or a retarder solvent.

The ink further comprises a binder, such as acrylate, styrene acrylic copolymer, polyurethane, nitrocellulose, polyamide, or latex. The binder can comprise a mix of several components, e.g. of those mentioned above, in order to give the ink needed properties. The properties to be considered are help to disperse and stabilise magnetic particles in the ink, to transport the magnetic particles during a printing process, to give adhesion to a substrate on which the print is made, i.e. on a layer of the laminate. Further properties to be considered are protection of the magnetic particles after printing and providing proper printing properties. For example, one component of the binder can serve as a dispersant for dispersing the magnetic particles evenly in the ink, while another can serve as and adhesive to the laminate, etc. For providing an ink that is suitable for high speed printing, the amount of binder can be between 20 and 60 percent of the weight of the ink, i.e. wet weight. A suitable amount has been found to be between 40 and 60 percent. Using between 50 and 55 percent has worked well.

The ink can further comprise additives, such as waxes and/or antifoaming agent. Suitable waxes can be polyethylene, polypropylene or polytetrafluoro ethylene, silicone, polyamide, ethylene vinyl acetate, ethylene butyl acetate, ethylene acrylic acid, etc. The amount of wax may be varied, but should be enough to prevent the ink from setting-off or smudge. Suitable antifoaming agents can be silicone or mineral oils. The amount of antifoaming agent should be enough for preventing the ink from foaming during printing on the moving web, especially at high-speed printing.

The ink can be prepared by mixing the magnetisable particles with the binder, e.g. by continuous shearing or stirring. The adding of particles, which may be made in portions, may be interrupted when the mix reaches about 40 to 50 degrees centigrade, and immediately adding any additives, e.g. the antifoam agent and/or the waxes, and the fluid such that the ready-to-use ink is provided.

The magnetisable particles can be maghemite or magnetite, or a combination thereof. These minerals are suitable for food packages since there is no restriction whether they may be in contact with the foodstuffs. The amount of magnetisable particles is between X and Y percent weight of the ink, preferably The size of the magnetisable particles, i.e. a length across the particle, a diameter, etc. depending on the assumed shape of the particle, has been found to give more or less beneficial properties of a remaining magnetic field when a magnetic mark is applied on a spot printed by the magnetisable ink. Smaller particles, i.e. in the magnitude of 0.1 µm, may be more dispersed, but each particle can of course hold less remaining magnetic field. Also, depending on the choice of binder, solvent, etc., the dispersion of such small particles may in practice be an issue, where lumping of the small particles may be an issue during preparation and handling of the ink. On the other hand, larger particles, i.e. in the magnitude of one or a few µm, may of course not be that dispersed as the smaller particles, but each particle can hold more remaining magnetic field, and the lumping of particles will be less apparent. A further increase of particle size has been found not to increase the aggregate remaining magnetic field that can be held with the amount of ink of the spots kept constant. Thus a suitable the size of the magnetisable particles can be between 0.1 and 2.5 µm. Preferable sizes can be between 1 and 8 µm for one embodiment, or between 0.4 and 1.5 µm for a further embodiment. A small particle approach can for example be having particles with a size of about 0.3 µm to provide a suitable trade-off between dispersion and the issue of lumping. Another approach can be to have particles with a size of about 1 µm to enable each particle to provide a significant amount of magnetic field and to minimize the issue of lumping. A further embodiment can be to have a particle size of about 0.4, 0.5, 0.6 or 0.7 µm to provide a little of both of the benefits for the two other examples given above. Here, the size given as "about" should be interpreted in the light of both that the shape of the particles may not give a certain geometric distance to measure, and that there is a natural spread in the sizes of the particles due to the preparation of them. Say for example that a particle size of a half micrometer is chosen, but the particles are prepared by grinding and have a slightly irregular shape. Thus, an average particle can then be a half micrometer across its largest available direction, while it only is 0.35 µm across its smallest direction. Further, for the largest direction, 80 percent of the particles may have a spread between 0.45 and 0.55 µm, while the remaining 20 percent may be out of that range, especially towards smaller particles caused by the grinding. The example is of course applicable for any chosen size. The spread can also be decreased by screening the particles after grinding.

Figure 3:
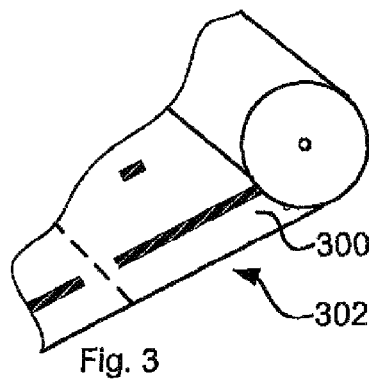
FIG. 3 schematically illustrates a web of packaging laminate according to an embodiment with regard to positions of magnetisable portions.
Figure 4:
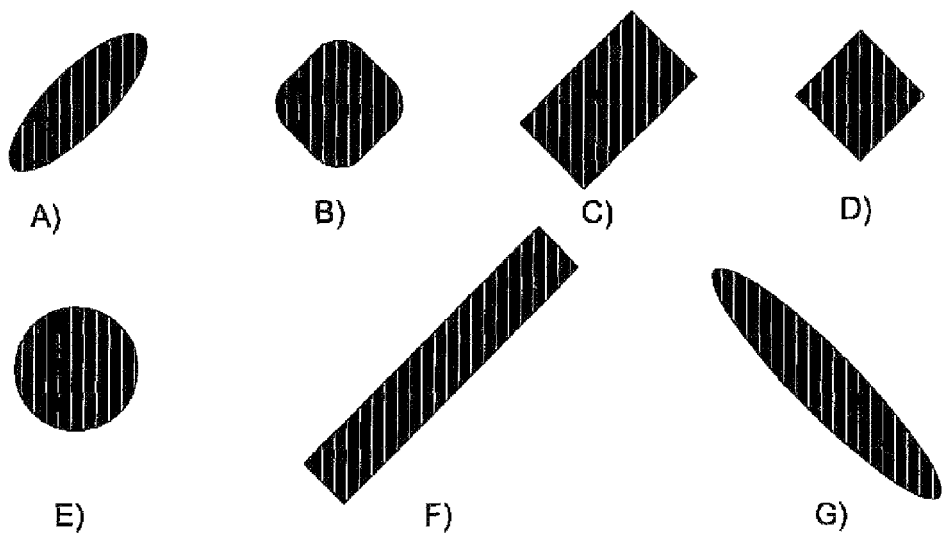
FIG. 4 illustrates different examples of shapes of magnetisable portions.

FIG. 3 illustrates a web of packaging material 300, comprising a plurality of magnetisable portions 302. The magnetisable portions can be distributed such that there is at least one or more magnetisable portions per package to be formed from the packaging material 300. The magnetisable portions comprise magnetisable particles, e.g. provided by a magnetic ink as demonstrated above. The magnetisable portions or "spots" can have a variety of shapes, as illustrated in FIG. 4, depending on the magnetic mark and the intention of the magnetic mark it is supposed to carry. The spots can be square, rectangular, circular, oval, or have an elongated shape being oriented in a longitudinal or transversal direction of the web. The size of the spot is chosen depending on the size of the mark it is supposed to carry. Preferably, the size of the spot is slightly larger to alleviate any problem in positioning deviation between printing of the spot and providing the magnetic mark to it. A larger spot is of course able to carry more magnetisation, which can be used for increasing magnetic field of a low-information carrying mark which thus will be easier to read, especially under harsh signal conditions, or be provided with more complex information, such as carrying information about the web or the particular part of the web. For a low-information carrying mark, the spot can have an area of 250 mm$^2$ or less, which for a square spot equals a side of about 15-16 mm, or a circular spot with a diameter of about 17-18 mm. For many applications, an area of 150 mm$^2$ or less is enough, and for some applications, an area of 25 mm$^2$ or even less may be sufficient. A magnetisable portion for carrying complex data, an elongated spot or bar can be suitable. By providing the elongated portion such that it stretches along a longitudinal direction of the web, sequential writing and reading of the complex data is neatly enabled as the web moves during manufacturing of the web and/or finishing of the packages.

The printed spots preferably comprise an amount of magnetic particles of between 0.5 and 4 g per m$^2$ spot area. Lower amounts may reduce ability to provide the magnetic information, and higher amounts may only increase consumption of magnetisable ink without improving the information carrying abilities. Printing larger amounts may also be a problem, especially at high-speed printing, since the ink may cause problems with setting-off. A preferable amount is between 1.5 and 4 g per m$^2$ to ensure information carrying abilities under various conditions. A fair trade-off of secure reading/writing, printing, and economy in ink consumption gives about 2 g per m$^2$.

The positioning of an elongated spot or bar can be positioned a predetermined distance from a longitudinal border of the web, wherein the data provided in the bar also can be used for alignment of the web in some applications.

The elongated spot or bar can be part of a strip along the web, being piecewise divided such that there is one part present for each package to be formed. The division is preferably positioned such that sealing of the package to be formed is enabled at the position of the division where there is no magnetisable print. The strip can have a magnetic mark indicating the sealing position by being arranged at a predetermined distance from the sealing position.

Figure 5:
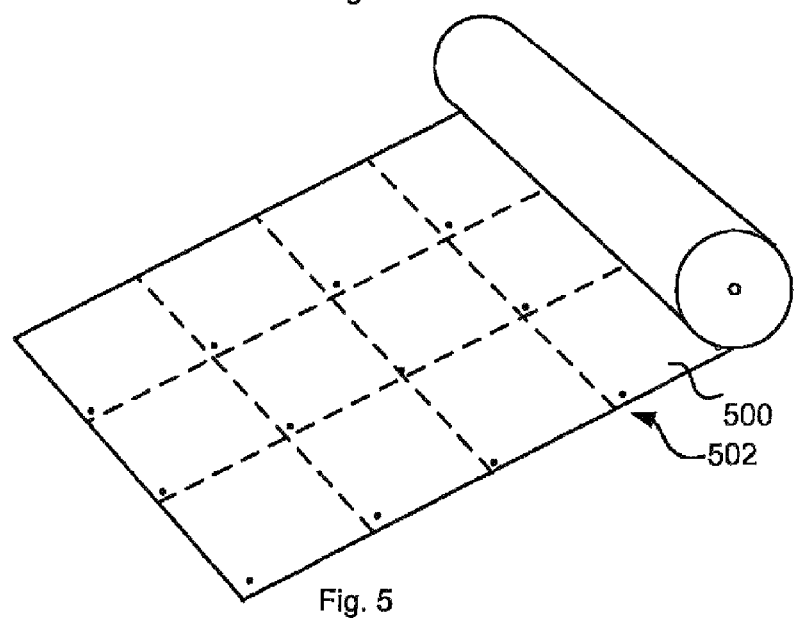
FIG. 5 schematically illustrates a web of packaging laminate according to an embodiment.

FIG. 5 illustrates a web 500 of packaging laminate comprising a plurality of magnetisable portions 502 thereon, here illustrated as dots. The web 500 is intended to form a plurality of packages for packaging of e.g. food or liquids. The dashed lines are imaginary and are intended to show the plurality of parts that will form the packages. The web 500 comprises at least one magnetisable portion per package. Thus, when the packages are formed from the packaging laminate, each package will have at least one magnetisable portion each. The spots preferably have any suitable combination of features according to what have been demonstrated above with reference to the geometry, printing, and the magnetisable ink.

Figure 6:
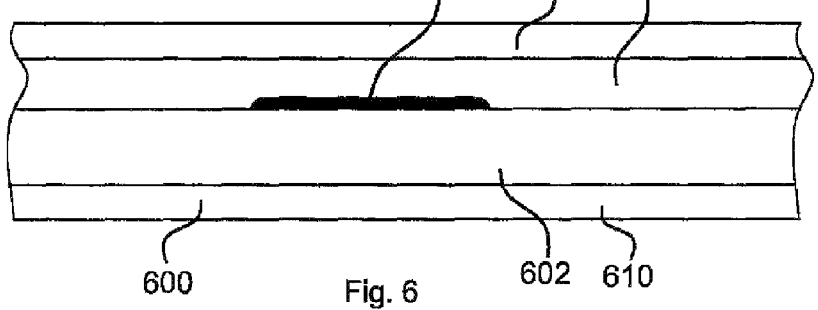
FIG. 6 illustrates an example of laminate structure.

The laminate can be a complex laminate comprising a plurality of layers, where each layer is selected for providing the final package the desired properties. For example, a further polymer layer 610 can be provided, e.g. to protect the paper layer from moisture, make the final package easier to handle and more rough to exposure form the environment, and/or simply to make the final package have a nicer appearance. The laminate can also comprise a single layer, although denoted as a laminate, if that provides the final package its desired properties, such as a single polymer layer. The laminate 600 can comprise a first layer 602 of paper and a second layer 604 of plastic coating, as illustrated in FIG. 6. The magnetisable portions can then be prints 608, e.g. in form of the spots or other shapes as demonstrated above with reference to the geometry, made on the layer of paper. There can also be further layers, such as a third layer 606 of metal foil. Further or fewer layers of different materials can be provided to give the desired properties of the final package. When the laminate comprises a metal foil layer 606, it is preferably made of a non-ferromagnetic metal, such as aluminum, such that the magnetisable portion is electromagnetically accessible through the metal foil for printing and reading of the magnetically stored information and/or position.

At least some spot of that/those which is/are present on each package is printed such that it is not visible from outside on the final package. That can for example be for the reason that the exterior of the package should be available for decoration and/or product information. Thus, the print is preferably made on the side of the web intended to face to the interior of the package, or at least on the side of a suitable layer, such as the paper layer as demonstrated above, intended to face towards the interior of the package.

Figure 7:
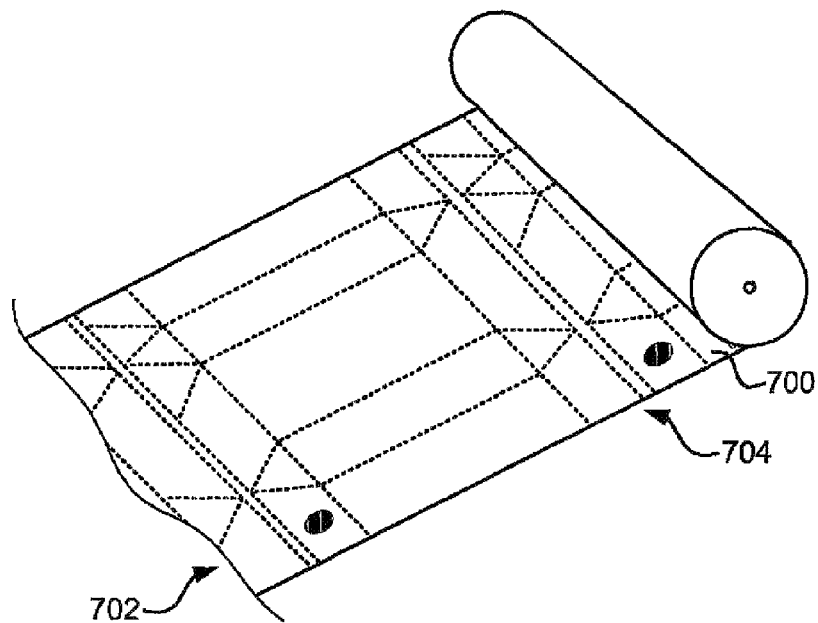
FIG. 7 schematically illustrates a web of packaging laminate according to an embodiment.

FIG. 7 illustrates a web 700 of packaging material comprising a plurality of magnetisable portions 702 thereon. The web 700 comprises at least one spot per package to be formed from the packaging material. Further, at least one preparation feature for enhancing finishing of packages is provided by the web. The at least one preparation feature is aligned with a magnetic field mark in the at least one magnetisable portion. For example, as illustrated in FIG. 7, crease lines are made in the web for enabling a swift and reliable finishing of the package. Upon making the crease lines, a mark, formed as a predefined magnetic field, in the magnetisable portion simultaneously with the making of the crease lines. The mechanism for making the crease lines, i.e. rolls with patterned grooves/protrusions, can be provided with a magnetising element. The magnetic mark will then be ensured to be aligned with the crease line making operation. The magnetising element can be a permanent magnet, or an electromagnet, for providing the magnetic field mark. When the magnet provided at the periphery of a crease roll comes in close vicinity of the magnetisable portion, the magnetisable particles of the magnetisable portion will be magnetised, and a magnetic field pattern will remain at the magnetisable portion. Thus, a magnetic field mark is provided. Preferably, the magnetisable portion is slightly larger than the geometric size of the magnetic field mark, i.e. the part of the magnetisable portion having a remaining magnetism. Thereby, the alignment of the magnetisable portion is not crucial as the magnetic field mark will be the element providing an accurate position, and not the print of the magnetisable portion itself. By provision of a suitable magnetic pattern, the accurate magnetic field mark can also be accurately read, as will be discussed further below.

The preparation feature can be other than provision of crease lines, such as providing openings, perforations, etc. The alignment follows the same principle, i.e. that the magnetising portion is provided at the mechanism providing the preparation feature such that the alignment will be inherent because of the structure.

The application of the magnetising element in the mechanism performing the preparation feature may arise a few issues. The magnetising element may for example not be provided at a position where the preparation feature demands a mechanical interaction with the packaging laminate, such as forming a crease line or punching a hole. Therefore, there is preferably provided a distance between an area of such a preparation feature and its aligned magnetic field mark. Further, the tool performing the interaction as mentioned above may be made of a ferromagnetic material. To improve the application of the magnetic field mark, the magnetising element may need to be provided with a holding or mounting means made of a non-ferromagnetic material, such as aluminum, wherein the distance may be further increased. Thus, depending on the preparation feature operation, and the tool for performing it, the distance is preferably for example at least 5 mm, at least 7 mm, or at least 10 mm.

As several operations performing feature preparations, it is preferable that each such operation have its aligned magnetic field mark. Those different magnetic field marks are each preferably made in a respective magnetisable portion adapted in position for the operation. As some operations may be interacting, one operation can use a magnetic field mark made by another operation as a master mark, or there may be provided a certain dedicated master mark that is not inherently aligned with any feature preparating operation, which thus only is used for reference by later performed operations.

Other magnetic field marks may hold complex data, and can for example be provided as long rectangular spots, i.e. as strips. The strips can be provided along the entire web, with or without interruptions at parts intended to be cut upon finishing the packages. The magnetic field marks holding complex data can for example provide a unique code from which the web, and also the part of the web, can be identified. The complex data can also give position information, indications for the finishing of the package, etc.

Figure 8:
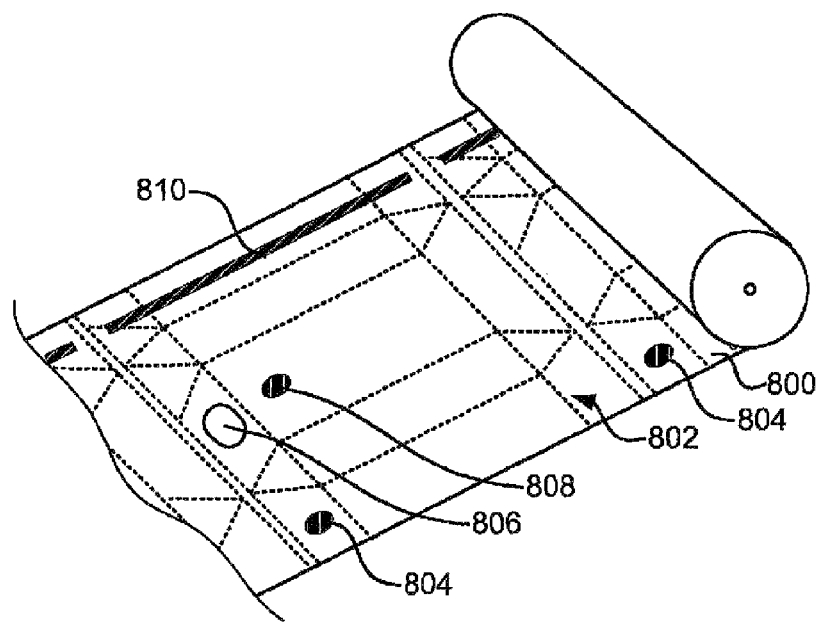
FIG. 8 schematically illustrates a web of packaging laminate according to an embodiment.

FIG. 8 illustrates an example of a web 800 comprising crease lines 802 and a magnetisable portion 804 holding position information for the crease lines by an aligned magnetic field mark. The web 800 also comprises a punched hole 806 for each package to be formed, and a magnetisable portion 808 holding position information for the respective punched hole 806 by an aligned magnetic field mark. This magnetic field mark can for example be used upon moulding a re-closable opening on the package upon finishing. The web 800 also comprises a strip 810 holding complex data, for example as elucidated above.

A further position information can be package boundary or sealing, where an operation is for dividing the web into the parts forming the package, or for the sealing of respective package.

A further position information, that the magnetisable portion can hold, is magnetic position marks at ends of a web of the packaging material, i.e. beginning of web and/or end of web, such that, at splicing of the webs, the splice is enabled to be aligned.

A further position information is positioning of an optical mark, which may beneficial compatibility for packaging machines having either optical reading or magnetic reading of positioning information. Preferably, the position of the spot holding this information is positioned similar to the optical mark, but on the side that is intended to become the inside of the package. Since the optical marks normally is provided on the part intended to form the bottom of the package, the corresponding magnetisable portion is positioned accordingly. A magnetic mark at this magnetisable portion is thus enabled to provide the similar information as the optical mark, and the optical reader of a packaging machine can thus simply be replaced with a magnetic reader. In practise, no optical mark is thus necessary if the optical readers are replaced by magnetic readers, and the magnetic mark takes the place of the optical mark as described above. In that case, the compatibility lies in the sense of the same mounting position of the readers in the packaging machine.

A further position information can be for a print for the package outside. This position information can be beneficial for ensuring proper alignment of the print with the package, and with other feature preparations of the package.

Upon making the magnetic field mark, it can be beneficial that the means for writing the magnetic field mark, e.g. a permanent magnet or a electromagnet arrangement, has no or little relative movement, or at least an approximately constant relative movement to the magnetisable portion. This is achieved for example by integrating the writing means in e.g. rolls for making the crease lines, wherein there is no relative movement since the periphery of the rolls and the web moves by the same speed in the same direction. Another way of achieving no or little relative movement, or at least an approximately constant relative movement to the magnetisable portion is to control the movement at the position of the writing. This can be done by having a slacking portion of the web both before and after the writing position such that speed at this position can be controlled irrespective of the speed of the web before and after that position. The slack can be achieved by letting the web move along a wave-formed path where the sizes of the waves are adaptable to give a variable slack. Thus, during the writing operation, the speed can be controllable at the writing position, and the web is accelerated or decelerated between the writing operations to adapt to the average speed of the web.

At least one of the spots for each package to be formed can be positioned not more than 20%, preferably between 5 and 15% of the width of the material to form a package from a longitudinal edge of the material to form the package. A magnetic field mark at such spots can then be used for controlling twisting of the material when forming the package. The forming of the package is normally made by forming some kind of tube which then is sealed in some way at its ends and formed into the desired shape. The tube can then be unintentionally twisted, which can jeopardize the forming of the package. Therefore, such a magnetic field mark can help to control any twisting of the tube to ensure forming of the package. By having these magnetic marks relatively close to the longitudinal edges to be joined to form the tube, the control is further enhanced since the reading of the magnetic field marks can be made from the side of the package where the joining takes place.

The invention claimed is:

1. A packaging material configured to be formed into a plurality of packaging containers each configured to contain a food product, the packaging material possessing a first surface arranged to face towards the food product in an interior of the packaging container formed from the packaging material, said packaging material comprising:
   a paper or paperboard layer;
   a plurality of magnetisable spots provided so that at least one spot is included with each packaging container to be formed from the packaging material, the spots comprising magnetisable particles, the spots being separate from one another and spaced apart from one another, the packaging material including crease lines to enhance finishing of the packaging containers formed from the packaging material, and wherein said magnetisable spots are applied directly on a surface of said paper or paperboard layer intended to face towards the interior of the packaging container formed from said packaging material.

2. The packaging material according to claim 1, wherein said at least one spot is applied through a printing operation.

3. The material according to claim 1, wherein said paper or paperboard layer is covered by plastic coatings.

4. The material according to claim 1, wherein the packaging material further comprises a metal foil layer of a non-ferromagnetic metal such that the magnetisable portion is electromagnetically accessible through the metal foil.

5. The material according to claim 4, wherein the metal foil layer is laminated to the surface of the paper or paperboard layer intended to face the interior of the packaging container.

6. The material according to claim 1, wherein the magnetisable particles are chosen from the group consisting of magnetite and maghemite.

7. The packaging material according to claim 2, wherein the at least one spot is a printed spot.

8. The material according to claim 7, wherein the paper or paperboard layer is covered by plastic coatings.

9. The material according to claim 7, wherein the packaging material further comprises a metal foil layer of a non-ferromagnetic metal such that the magnetisable portion is electromagnetically accessible through the metal foil.

10. The material according to claim 9, wherein the metal foil layer is laminated to the surface of the paper or paperboard layer intended to face the interior of the packaging container.

11. The material according to claim 2, wherein the magnetisable particles are chosen from the group consisting of magnetite and maghemite.

12. The material according to claim 3, wherein the packaging material further comprises a metal foil layer of a non-ferromagnetic metal such that the magnetisable portion is electromagnetically accessible through the metal foil.

13. The material according to claim 12, wherein the metal foil layer is laminated to a printed the surface of the paper or paperboard layer intended to face the interior of the packaging container.

14. The material according to claim 3, wherein the magnetisable particles are chosen from the group consisting of magnetite and maghemite.

15. A packaging material sized to form a plurality of packaging containers each having an interior and an exterior, the packaging material comprising:
- a paper or paperboard layer possessing a surface which will face towards the interior of the packaging containers when the packaging material is formed into the plurality of packaging containers;
- a plurality of magnetisable spots each comprised of magnetisable particles and each applied directly on the surface of the paper or paperboard layer which will face towards the interior of the packaging containers when the packaging material is formed into the plurality of packaging containers;
- the magnetisable spots being distributed on the surface of the paper or paperboard layer so that there is at least one magnetisable spot per packaging container to be formed from the packaging material;
- the magnetisable spots being separate from one another and spaced apart from one another by non-magnetisable portions;
- a metal foil layer on the surface of the paper or paperboard layer which will face towards the interior of the packaging containers when the packaging material is formed into the plurality of packaging containers; and
- the magnetisable spots being positioned between the metal foil layer and the paper or paperboard layer and being electromagnetically accessible through the metal foil layer.

16. A packaging material sized to form a plurality of packaging containers, the packaging material possessing one surface which will face towards an interior of the packaging containers when the packaging material is formed into packaging containers and an opposite surface which will face an exterior of the packaging containers when the packaging material is formed into packaging containers, the packaging material comprising:
- a paper or paperboard layer possessing both a surface which will face towards the interior of the packaging containers and a surface which will face towards the exterior of the packaging containers when the packaging material is formed into the plurality of packaging containers;
- a metal foil layer on the surface of the paper or paperboard layer which will face towards the interior of the packaging containers when the packaging material is formed into the plurality of packaging containers;
- a plastic coating layer on the metal foil layer so that the metal foil layer is positioned between the plastic coating layer and the paper or paperboard layer;
- exterior printing which will face towards the exterior of the packaging containers when the packaging material is formed into the plurality of packaging containers;
- a plurality of magnetisable spots each comprised of magnetisable particles and each applied directly on the surface of the paper or paperboard layer which will face towards the interior of the packaging containers when the packaging material is formed into the plurality of packaging containers;
- the magnetisable spots being distributed on the surface of the paper or paperboard layer so that there is at least one magnetisable spot per packaging container to be formed from the packaging material;
- the magnetisable spots being separate from one another and spaced apart from one another; and
- the magnetisable spots being positioned between the metal foil layer and the paper or paperboard layer and being electromagnetically accessible through the metal foil layer.

17. The packaging material of claim 16, wherein the packaging material further comprises crease lines, an opening, or perforations.

18. A packaging material configured to be formed into a plurality of packaging containers each configured to contain a food product, the packaging material possessing a first surface arranged to face towards the food product in an interior of the packaging container formed from the packaging material, said packaging material comprising:
- a paper or paperboard layer;
- a plurality of magnetisable spots provided so that at least one spot is included with each packaging container to be formed from the packaging material, the spots comprising magnetisable particles, the spots being separate from one another and spaced apart from one another,
- an inner plastic coating layer on the paper or paperboard layer and arranged to face towards the food product in the interior of the packaging container formed from the packaging material, wherein said magnetisable spots are applied directly on a surface of said paper or paperboard layer intended to face towards the interior of the packaging container formed from said packaging material, wherein said magnetisable spots are positioned between the inner plastic coating layer and said paper or paperboard layer.

19. The packaging material of claim 18, further comprising an outer plastic coating layer on the paper or paperboard layer and arranged to face towards an exterior of the packaging container formed from the packaging material.

20. The packaging material of claim 18, wherein the packaging material includes crease lines, openings, or perforations to enhance finishing of the plurality of packaging containers formed from the packaging material.

21. The packaging material of claim 18, further comprising a metal foil layer on the surface of said paper or paperboard layer and arranged to face towards the interior of the packaging container, the metal foil layer being located between the inner plastic coating layer and the paper or paperboard layer, and wherein said magnetisable spots are positioned between the metal foil layer and said paper or paperboard layer.

* * * * *